(12) United States Patent
Yang

(10) Patent No.: US 11,915,149 B2
(45) Date of Patent: Feb. 27, 2024

(54) SYSTEM FOR MANAGING CALCULATION PROCESSING GRAPH OF ARTIFICIAL NEURAL NETWORK AND METHOD OF MANAGING CALCULATION PROCESSING GRAPH BY USING THE SAME

(71) Applicant: SAMSUNG ELECTRONICS CO., LTD., Suwon-si (KR)

(72) Inventor: Seung-Soo Yang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1156 days.

(21) Appl. No.: 16/561,760

(22) Filed: Sep. 5, 2019

(65) Prior Publication Data

US 2020/0151579 A1 May 14, 2020

(30) Foreign Application Priority Data

Nov. 8, 2018 (KR) .......................... 10-2018-0136801

(51) Int. Cl.
*G06N 3/10* (2006.01)
*G06F 9/50* (2006.01)
*G06N 3/063* (2023.01)

(52) U.S. Cl.
CPC ............. *G06N 3/10* (2013.01); *G06F 9/5066* (2013.01); *G06N 3/063* (2013.01)

(58) Field of Classification Search
CPC ....................................................... G06N 3/10
(Continued)

(56) References Cited

U.S. PATENT DOCUMENTS 5,561,801 A * 10/1996 Simons ..................... G06F 8/45
717/149
7,948,910 B2   5/2011 Arbel et al.
(Continued)

FOREIGN PATENT DOCUMENTS

KR      10-0968774 B1    7/2010
WO   WO-2016141991 A1 * 9/2016   ............. G06F 8/447

OTHER PUBLICATIONS

A. Dasu, A. Sudarsanam and S. Panchanathan, "Design of embedded compute-intensive processing elements and their scheduling in a reconfigurable environment," in Canadian Journal of Electrical and Computer Engineering, vol. 30, No. 2, pp. 103-113, Spring 2005, doi: 10.1109/CJECE.2005.1541732. (Year: 2005).*

(Continued)

*Primary Examiner* — James D. Rutten
(74) *Attorney, Agent, or Firm* — Sughrue Mion, PLLC

(57) ABSTRACT

Provided are a system for managing a calculation processing graph of an artificial neural network and a method of managing a calculation processing graph by using the system. A system for managing a calculation processing graph of an artificial neural network run by a plurality of heterogeneous resources includes: a task manager configured to allocate the plurality of heterogeneous resources to a first subgraph and a second subgraph that are to be run, the first subgraph and the second subgraph being included in the calculation processing graph; a first compiler configured to compile the first subgraph to be executable on a first resource among the plurality of heterogeneous resources; and a second compiler configured to compile the second subgraph to be executable on a second resource among the plurality of heterogeneous resources, wherein the first subgraph and the second subgraph are respectively managed through separate calculation paths.

19 Claims, 14 Drawing Sheets

(58) Field of Classification Search
USPC .......................................................... 706/44
See application file for complete search history.

(56) References Cited

U.S. PATENT DOCUMENTS

| | | | |
|---|---|---|---|
| 8,051,412 B2 | 11/2011 | Kasahara et al. | |
| 8,365,153 B2 | 1/2013 | Chen et al. | |
| 8,407,679 B2 | 3/2013 | Komatsu et al. | |
| 9,032,377 B2 | 5/2015 | Mizrachi et al. | |
| 9,715,373 B2 | 7/2017 | Boehm et al. | |
| 9,811,777 B2 | 11/2017 | Guo et al. | |
| 2002/0029357 A1* | 3/2002 | Charnell | G06F 9/455 712/E9.082 |
| 2008/0082644 A1* | 4/2008 | Isard | H04L 67/1097 709/223 |
| 2009/0125370 A1* | 5/2009 | Blondeau | G06Q 10/0633 706/12 |
| 2010/0153934 A1 | 6/2010 | Lachner | |
| 2012/0110559 A1* | 5/2012 | Dolinsky | G06F 8/45 717/100 |
| 2013/0055063 A1* | 2/2013 | Mondal | G06F 9/4552 715/234 |
| 2014/0101661 A1* | 4/2014 | Levin | G06N 3/049 718/102 |
| 2015/0128150 A1* | 5/2015 | Ueda | G06F 9/5088 718/105 |
| 2017/0124452 A1* | 5/2017 | Tucker | G06N 3/063 |
| 2017/0124454 A1* | 5/2017 | Vasudevan | G06F 9/5066 |
| 2018/0060034 A1 | 3/2018 | Nicol et al. | |
| 2018/0136912 A1 | 5/2018 | Venkataramani et al. | |
| 2020/0301898 A1* | 9/2020 | Samynathan | G06F 16/2453 |

OTHER PUBLICATIONS

Psaroudakis et al. (2016). Task Scheduling for Highly Concurrent Analytical and Transactional Main Memory Workloads, accessed online at <web.archive.org/web/20160715000000*/https://15721. courses.cs.cmu.edu/spring2016/papers/psaroudakis_adms13.pdf>(Year: 2016).*

* cited by examiner

SYSTEM FOR MANAGING CALCULATION PROCESSING GRAPH OF ARTIFICIAL NEURAL NETWORK AND METHOD OF MANAGING CALCULATION PROCESSING GRAPH BY USING THE SAME

CROSS-REFERENCE TO RELATED APPLICATION

This application claims the benefit of Korean Patent Application No. 10-2018-0136801, filed on Nov. 8, 2018, in the Korean Intellectual Property Office, the disclosure of which is incorporated herein in its entirety by reference.

BACKGROUND

The inventive concept relates to a neural network system for managing a calculation processing graph of an artificial neural network and a method of managing a calculation processing graph by using the neural network system, and more particularly, to a neural network system for performing parallel compilation on a calculation processing graph and a method of managing a calculation processing graph by using the neural network system.

Artificial neural networks (ANNs) refer to computational architectures modeling biological brains. Deep learning, machine learning, or the like may be implemented based on artificial neural networks. Recently, as calculations to be processed by using an ANN have rapidly increased, there is a need to efficiently perform calculation processing by using an ANN.

SUMMARY

The inventive concept provides a neural network system for processing, in parallel, a calculation processing graph allocated to a plurality of heterogeneous resources and a method of managing a calculation processing graph by using the neural network system.

According to an aspect of the inventive concept, there is provided a system for managing a calculation processing graph of an ANN run by a plurality of heterogeneous resources, the system including: a task manager configured to allocate the plurality of heterogeneous resources to a first subgraph and a second subgraph that are to be run, the first subgraph and the second subgraph being included in the calculation processing graph; a first compiler configured to compile the first subgraph to be able to run on a first resource among the plurality of heterogeneous resources; and a second compiler configured to compile the second subgraph to be able to run on a second resource among the plurality of heterogeneous resources, wherein the first subgraph and the second subgraph are respectively managed through separate calculation paths.

According to another aspect of the inventive concept, there is provided method of managing a calculation processing graph of an ANN run by a plurality of heterogeneous resources, the method including: allocating a first subgraph among a plurality of subgraphs constituting the calculation processing graph to a first resource among the plurality of heterogeneous resources; compiling the first subgraph to be able to run on the first resource; allocating a second subgraph among the plurality of subgraphs to a second resource among the plurality of heterogeneous resources; and compiling the second subgraph to be able to run on the second resource, wherein the first subgraph and the second subgraph are respectively managed through separate calculation paths.

According to yet another aspect of the inventive concept, there is provided a device for performing deep learning by using a calculation processing graph of an ANN, the device including: a first compiler configured to compile at least a portion of the calculation processing graph to be able to run on a first resource; a second compiler configured to compile at least a portion of the calculation processing graph to be able to run on a second resource that is different from the first resource; and a task manager configured to output a first subgraph included in the calculation processing graph to the first compiler and output a second subgraph included in the calculation processing graph to the second compiler, wherein the first compiler and the second compiler are operated independently of each other.

In one aspect of the inventive concept, there is a system for managing a calculation processing graph of an ANN run by a plurality of heterogeneous resources, the system including: at least one processor configured to implement: a task manager configured to allocate the plurality of heterogeneous resources to a first subgraph and a second subgraph, the first subgraph and the second subgraph being of the calculation processing graph of the ANN; a first compiler configured to compile the first subgraph to be able to run on a first resource among the plurality of heterogeneous resources; and a second compiler configured to compile the second subgraph to be able to run on a second resource among the plurality of heterogeneous resources, wherein the first subgraph and the second subgraph respectively output to the first compiler and the second compiler through separate calculation paths.

In another aspect of the inventive concept, there is a method of managing a calculation processing graph of an ANN run by a plurality of heterogeneous resources, the method including: allocating a first subgraph among a plurality of subgraphs of the calculation processing graph to a first resource among the plurality of heterogeneous resources, the calculation processing graph being of the ANN; compiling the first subgraph to be able to run on the first resource; allocating a second subgraph among the plurality of subgraphs to a second resource among the plurality of heterogeneous resources; and compiling the second subgraph to be able to run on the second resource, wherein the first subgraph and the second subgraph are respectively output to the first compiler and the second compiler through separate calculation paths.

In yet another aspect of the inventive concept, there is a device of performing deep learning by using a calculation processing graph of an ANN, the device including: at least one processor configured to implement: a first compiler configured to compile at least a portion of the calculation processing graph to be able to run on a first resource, the calculation processing graph being of the ANN; a second compiler configured to compile at least a portion of the calculation processing graph to be able to run on a second resource that is different from the first resource; and a task manager configured to output a first subgraph in the calculation processing graph to the first compiler and output a second subgraph in the calculation processing graph to the second compiler, wherein the first compiler and the second compiler are operated independently of each other.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
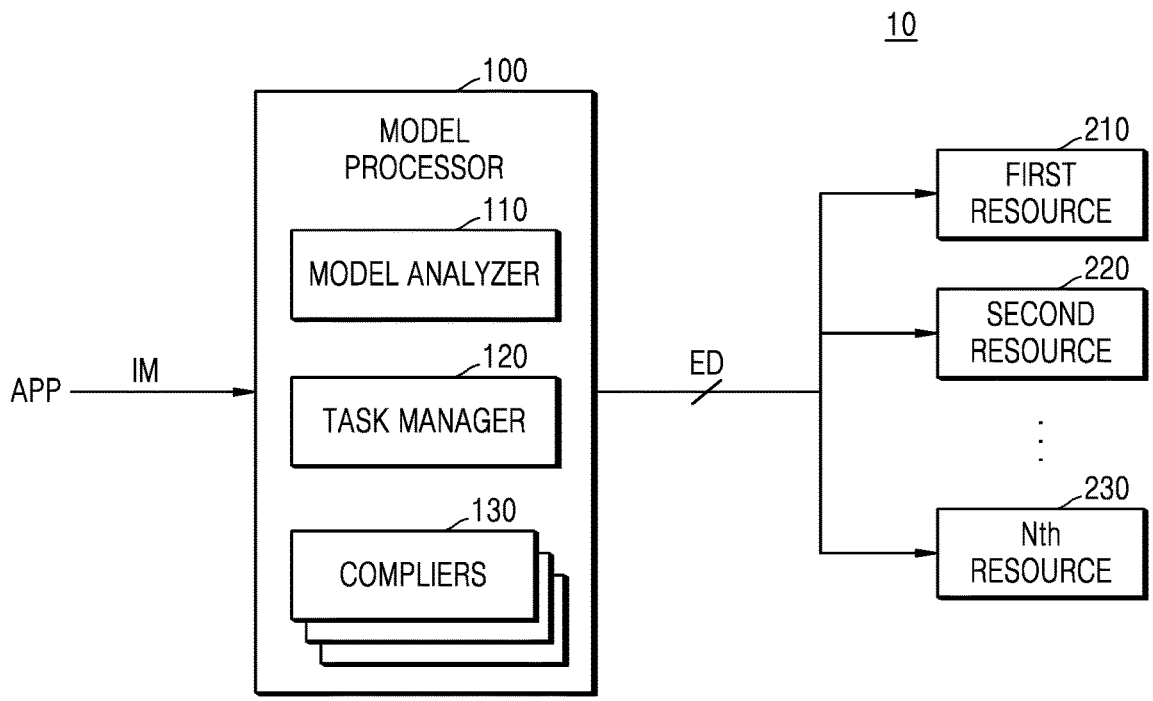
FIG. 1 is a block diagram illustrating a neural network system according to an example embodiment.

FIG. 1 is a block diagram illustrating a neural network system according to an example embodiment.

Referring to FIG. 1, a neural network system 10, e.g., an artificial neural network system, may include a plurality of applications APP, a model processor 100, and a plurality of resources including a first resource 210, a second resource 220, and Nth resource 230. The plurality of applications APP may be generated by various application programming interfaces (APIs) and may perform various tasks by using an artificial neural network model. For example, the plurality of applications APP may request the model processor 100 to perform data processing using an ANN model by outputting an input model IM to the model processor 100.

The model processor 100 may include a model analyzer 110, a task manager 120, and a plurality of compilers 130. Each of the components included in the model processor 100 may be implemented with software and may be implemented with a neural network platform such as an evolutionary deep network (EDEN). In another example, each of the components included in the model processor 100 may be implemented with hardware such as an electronic circuit. In one example, the model processor 100 may be implemented with a framework of an ANN. In another example, the model processor 100 may be implemented by at least one processor, so that a single processor implements the model processor 100 or so that a plurality of processors implement the model processor 100.

The model analyzer 110 may receive the input model IM including data, which uses an ANN, from the plurality of applications APP and may generate a calculation processing graph including a plurality of subgraphs by analyzing the input model IM. The term "calculation processing graph" used herein may refer to a data structure represented by a graph including a plurality of calculation nodes. The model analyzer 110 may generate the plurality of subgraphs by dividing the calculation processing graph into structures suitable to be processed respectively by the plurality of resources including a first resource 210, a second resource 220, and Nth resource 230. The model analyzer 110 may output the calculation processing graph and the plurality of subgraphs to the task manager 120.

The task manager 120 may allocate the plurality of subgraphs including calculation nodes to the plurality of resources, including a first resource 210, a second resource 220, and Nth resource 230, whereby there may be additional resources between the second resource 220 and the Nth resource 230. According to the inventive concept, the task manager 120 may allocate a suitable resource (for example, a first resource 210, a second resource 220, or Nth resource 230) to each of the plurality of subgraphs based on structural features of each subgraph and kinds of calculations included in each subgraph. The task manager 120 may respectively output the plurality of subgraphs to the plurality of compilers 130, each corresponding to the allocated resource, via separate calculation paths. According to one embodiment, the plurality of subgraphs may be respectively managed via separate calculation paths (or threads) and thus be respectively output to the plurality of compilers 130 in parallel.

Each of the plurality of compilers 130 may compile a subgraph received from the task manager 120 such that the subgraph is translated into a program language understandable by each of the resources including a first resource 210, a second resource 220, and Nth resource 230. Each of the plurality of compilers 130 may correspond to one resource and may compile a subgraph received from the task manager 120 into a program language of the corresponding resource. In one example, a first compiler among the plurality of compilers 130 may correspond to a first resource 210 and may compile a received subgraph into a program language corresponding to the first resource 210. In addition, a second compiler among the plurality of compilers 130 may correspond to a second resource 220 and may compile a received subgraph into a program language corresponding to the second resource 220. Each of the plurality of compilers 130 may generate execution data ED by compiling a subgraph and may output the generated execution data ED to a corresponding resource (for example, a first resource 210, a second resource 220, or Nth resource 230). In one example, the execution data ED may be implemented as a program file translated into a program language corresponding to a resource.

According to the inventive concept, the plurality of compilers 130 may perform compilation independently of each other, and thus, parallel compilation may be performed on the plurality of subgraphs. In one example, even while the first compiler among the plurality of compilers 130 compiles a first subgraph, the second compiler among the plurality of compilers 130 may compile a second subgraph. Thus, the time required for compilation may be reduced and calculation processing of an ANN may be efficiently performed.

The plurality of resources including a first resource 210, a second resource 220, and Nth resource 230 may include calculation resources and communication resources. For example, the calculation resources may include various calculation processing devices such as a central processing unit (CPU), a graphics processing unit (GPU), an application processor (AP), a digital signal processor (DSP), a field-programmable gate array (FPGA), a neural network processing unit (NPU), an electronic control unit (ECU), an image signal processor (ISP), and the like. The communication resources may include resources capable of supporting internal communication such as a system bus, peripheral component interconnect (PCI), PCI express (PCIe), serial advanced technology attachment (SATA), small computer system interface (SCSI), and serial attached SCSI (SAS) and/or supporting external communication such as universal serial bus (USB), Ethernet, WiFi, Bluetooth, near field communication (NFC), radio frequency identification (RFID), and mobile telecommunication.

Each of the calculation resources may include specific task-dedicated hardware. For example, an NPU may include specific task-dedicated hardware used to process calculation using an ANN.

The plurality of resources including a first resource 210, a second resource 220, and Nth resource 230 may include heterogeneous resources. In one example, the first resource 210 may include an NPU and the second resource 220 may include a GPU. Each of the plurality of resources including a first resource 210, a second resource 220, and Nth resource 230 may execute a calculation for a subgraph by executing the execution data ED received from a corresponding compiler.

According to the inventive concept, the plurality of resources including a first resource 210, a second resource 220, and Nth resource 230 may load the execution data ED independently of each other. The time for which each of the plurality of resources including a first resource 210, a second resource 220, and Nth resource 230 loads the execution data ED from the model processor 100 may be needed, and in one example, while the first resource 210 executes a calculation by executing first execution data corresponding thereto, the second resource 220 may load second execution data corresponding thereto from the model processor 100, whereby the load time may be reduced and the total calculation processing time may be reduced.

Although not shown, the model processor 100 may further include an operating system for running the model analyzer 110, the task manager 120, and the plurality of compilers 130. The operating system may include various mobile operating systems, on-line operating systems, off-line operating systems, and the like. In one example, the operating system may be implemented with Linux, Android based on Linux, Windows, iOS, Mac OS, Chromium OS, or the like.

Figure 2:
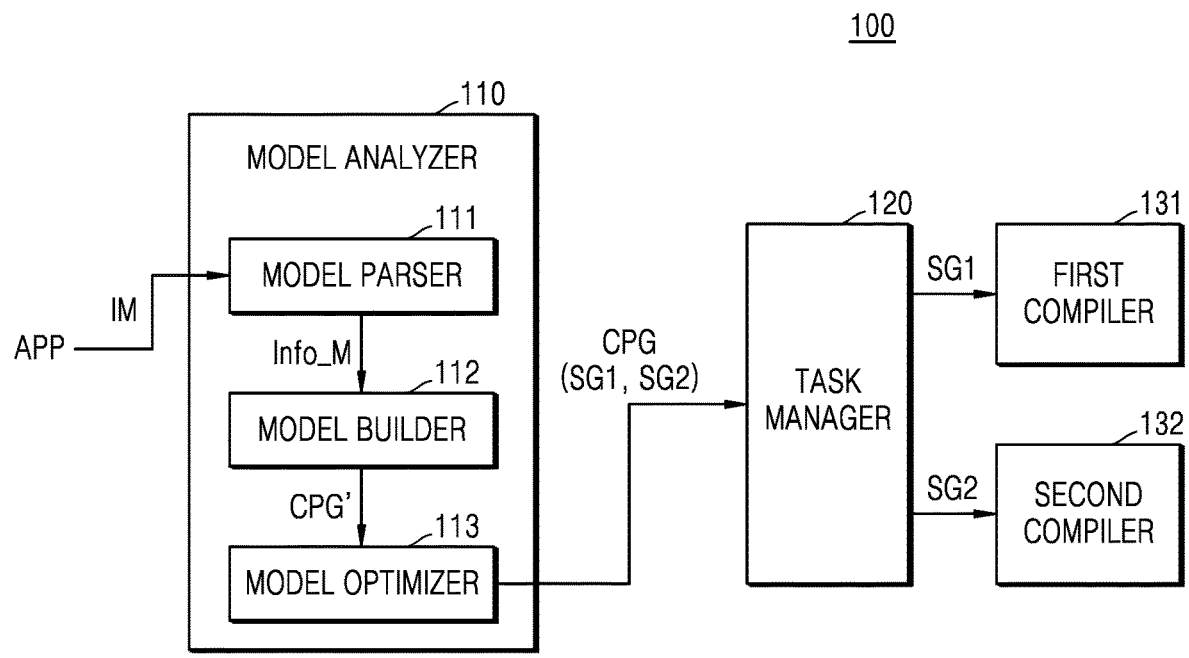
FIG. 2 is a block diagram illustrating a model processor according to an example embodiment.

FIG. 2 is a block diagram illustrating a model processor according to an example embodiment. Repeated descriptions given with reference to FIG. 1 will be omitted.

Referring to FIG. 2, the model processor 100 may include the model analyzer 110, the task manager 120, a first compiler 131, and a second compiler 132, and the model analyzer 110 may include a model parser 111, a model builder 112, and a model optimizer 113. Although FIG. 2 illustrates an example in which the model processor 100 includes two compilers (for example, 131 and 132), this is merely an example, and the model processor 100 may include more than two compilers.

The model parser 111 may generate model information Info_M by parsing the input model IM received from an application APP. The input model IM may include request information for executing instructions programmed into the application APP, and the term "parsing" may refer to a process of analyzing grammatical construction or syntax of the input model IM.

The model builder 112 may generate a calculation processing graph CPG' from the input model IM based on the model information Info_M received from the model parser 111. The calculation processing graph CPG' may refer to a graph including a plurality of calculation nodes.

The model optimizer 113 may perform an optimization operation on the calculation processing graph CPG' and may output, to the task manager 120, a calculation processing graph CPG generated as a result of the optimization operation. The optimization operation may refer to an operation of minimizing and optimizing an amount of calculation processing for the calculation processing graph CPG'. In one embodiment, the optimization operation may include a graph substitution operation for substituting at least a portion of the calculation processing graph CPG' with another graph, a graph merging operation for merging at least portions of the calculation processing graph CPG', and a graph division operation for dividing at least a portion of the calculation processing graph CPG'.

The model analyzer 110 may partition the optimized calculation processing graph CPG into a plurality of subgraphs including a first subgraph SG1 and a second subgraph SG2 and may output the first subgraph SG1 and the second subgraph SG2 to the task manager 120.

The task manager 120 may respectively allocate a plurality of subgraphs SG1 and SG2 of the calculation processing graph CPG to a plurality of compilers including a first compiler 131 and a second compiler 132. According to one embodiment, each of the plurality of subgraphs SG1 and SG2 may correspond to one resource, and the task manager 120 may respectively allocate the plurality of subgraphs SG1 and SG2 to the plurality of compilers including a first compiler 131 and a second compiler 132, each corresponding to a suitable resource.

In one embodiment, the task manager 120 may receive information on the hardware capability of each of a plurality of resources and may determine a suitable resource for each of the plurality of subgraphs SG1 and SG2. The task manager 120 may respectively allocate the plurality of subgraphs SG1 and SG2 to the plurality of compilers including a first compiler 131 and a second compiler 132, each corresponding to the determined resource.

In the example of FIG. 2, the first compiler 131 may correspond to a first resource (not shown), and the second compiler 132 may correspond to a second resource (not shown). That is, the first compiler 131 may compile a received input into a program language used in the first resource, and the second compiler 132 may compile a received input into a program language used in the second resource.

The task manager 120 may allocate the received first subgraph SG1 of the calculation processing graph CPG to the first resource and allocate the received second subgraph SG2 of the calculation processing graph CPG to the second resource, based on the information on the hardware capability of each resource. The task manager 120 may output the first subgraph SG1 allocated to the first resource to the first compiler 131 corresponding to the first resource and output the second subgraph SG2 allocated to the second resource to the second compiler 132 corresponding to the second resource. The first compiler 131 may compile the first subgraph SG1 to be able to run on the first resource, and the second compiler 132 may compile the second subgraph SG2 to be able to run on the second resource. In an embodiment, compiling a subgraph to be able to run on a resource is converting or transforming the subgraph into a code or form to be read and executed by the resource.

Figure 3:
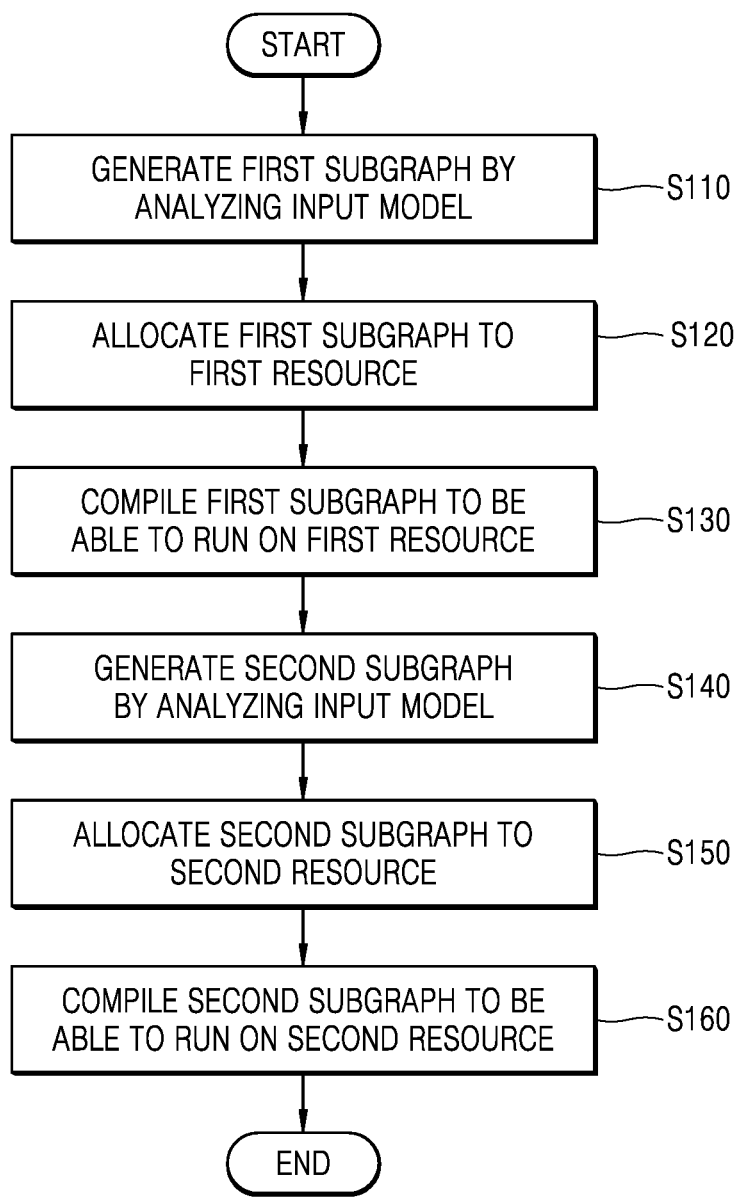
FIG. 3 is a flowchart illustrating operations of a model processor, according to an example embodiment.

FIG. 3 is a flowchart illustrating operations of a model processor, according to an example embodiment.

Referring to FIGS. 2 and 3, the model processor 100 may generate the first subgraph SG1 by analyzing the input model IM (S110). The model processor 100 may allocate the first subgraph SG1 to the first resource (S120). The model processor 100 may compile the first subgraph SG1 to be able to run on the first resource (S130). In one embodiment, the first subgraph SG1 may be compiled by the first compiler 131 corresponding to the first resource.

The model processor 100 may generate the second subgraph SG2 by analyzing the input model IM (S140). The model processor 100 may allocate the second subgraph SG2 to the second resource (S150). The model processor 100 may compile the second subgraph SG2 to be able to run on the second resource (S160). In one embodiment, the second subgraph SG2 may be compiled by the second compiler 132 corresponding to the second resource.

According to one embodiment, the model processor 100 may compile the first subgraph SG1 before generating the second subgraph SG2 by analyzing the input model IM. That is, before the analysis of the input model IM is completed, the first subgraph SG1 may be compiled. Thus, the time required to process the calculation processing graph CPG may be reduced.???

Figure 4:
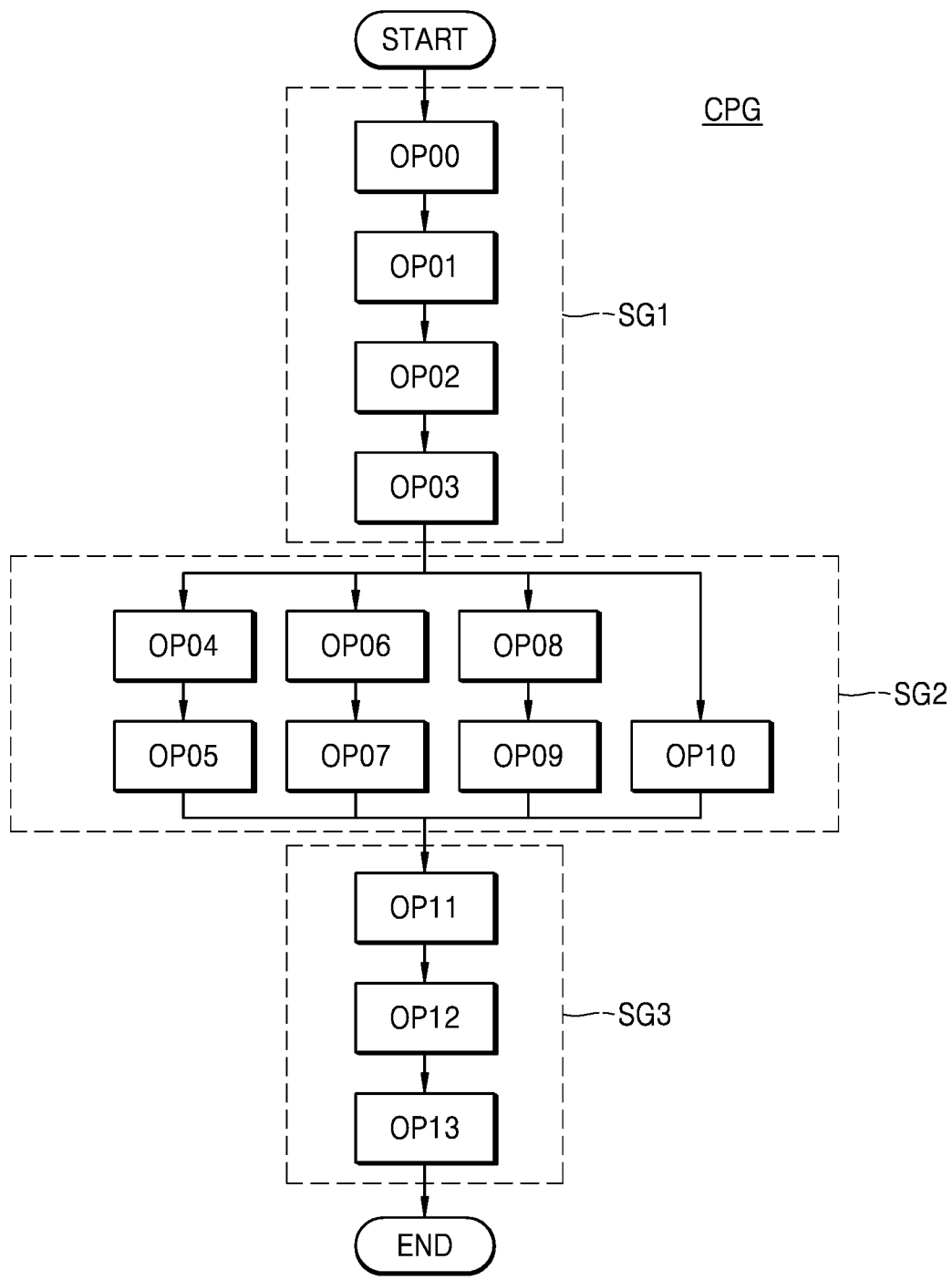
FIG. 4 is a diagram illustrating a calculation processing graph according to an example embodiment.

FIG. 4 is a diagram illustrating a calculation processing graph according to an example embodiment.

Referring to FIGS. 2 and 4, the model analyzer 110 may generate the calculation processing graph CPG including first to fourteenth calculations OP00 to OP13 by analyzing the input model IM. Each of the first to fourteenth calculations OP00 to OP13 may represent various mathematical calculations (for example, a convolution calculation, a rectified linear unit calculation, a memory copy calculation, or the like), and the first to fourteenth calculations OP00 to OP13 may be identical to or different from each other.

The model analyzer 110 may partition the generated calculation processing graph CPG into a plurality of subgraphs SG1, SG2, and SG3 based on kinds of calculations, calculation preferences, shapes of graphs, and the like. In the example of FIG. 4, the model analyzer 110 may classify first to fourth calculations OP00 to OP03 as the first subgraph SG1, classify fifth to eleventh calculations OP04 to OP10 as the second subgraph SG2, and classify twelfth to fourteenth calculations OP11 to OP13 as a third subgraph SG3.

The task manager 120 may receive the calculation processing graph CPG including first to third graphs SG1 to SG3 and may respectively allocate the first to third graphs SG1 to SG3 to a plurality of resources. In one embodiment, the task manager 120 may allocate each of the first to third graphs SG1 to SG3 to a suitable resource based on the hardware capability of each of the plurality of resources.

In one example, the task manager 120 may allocate the first subgraph SG1 and the third subgraph SG3 to a first resource (for example, an NPU) and allocate the second subgraph SG2 to a second resource (for example, a GPU). In another example, the task manager 120 may allocate the first subgraph SG1 to a first resource (for example, an NPU), allocate the second subgraph SG2 to a second resource (for example, a GPU), and allocate the third subgraph SG3 to a third resource (for example, a CPU).

The task manager 120 may output each of the first to third graphs SG1 to SG3 to each of the compilers 131 and 132, which corresponds to the allocated resource, and each of the compilers 131 and 132 may generate a plurality of pieces of execution data by compiling each of the received first to third graphs SG1 to SG3.

Figure 5:
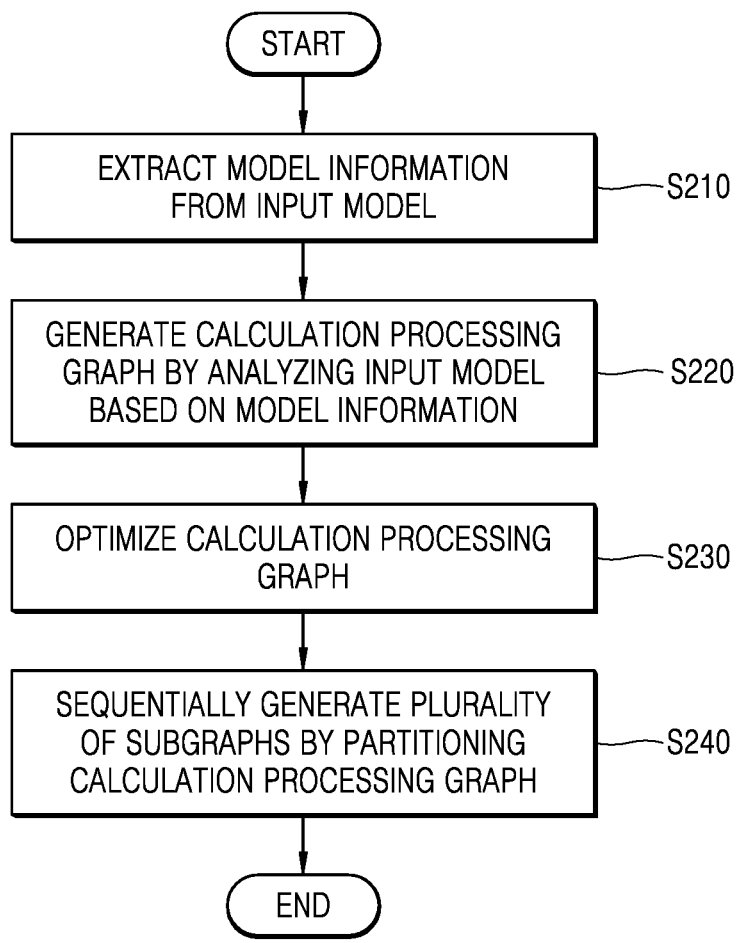
FIG. 5 is a flowchart illustrating operations of a model analyzer, according to an example embodiment.

FIG. 5 is a flowchart illustrating operations of a model analyzer, according to an example embodiment.

Referring to FIGS. 2 and 5, the model analyzer 110 may extract the model information Info_M from the input model IM (S210). The model analyzer 110 may generate the calculation processing graph CPG' by analyzing the input model IM based on the model information Info_M (S220). The model analyzer 110 may optimize the calculation processing graph CPG' (S230). In one example, the model analyzer 110 may generate the optimized calculation processing graph CPG by performing at least one of a graph substitution operation for substituting at least a portion of the calculation processing graph CPG' with another graph, a graph merging operation for merging at least portions of the calculation processing graph CPG', and a graph division operation for dividing at least a portion of the calculation processing graph CPG'. Hereinafter, the expression, "at least one of a, b, and c," should be understood as including only a, only b, only c, both a and b, both a and c, both b and c, all of a, b, and c, or all variations thereof. The model analyzer 110 may sequentially generate the plurality of subgraphs SG1 and SG2 by dividing the optimized calculation processing graph CPG according to graph features (S240).

Figure 6:
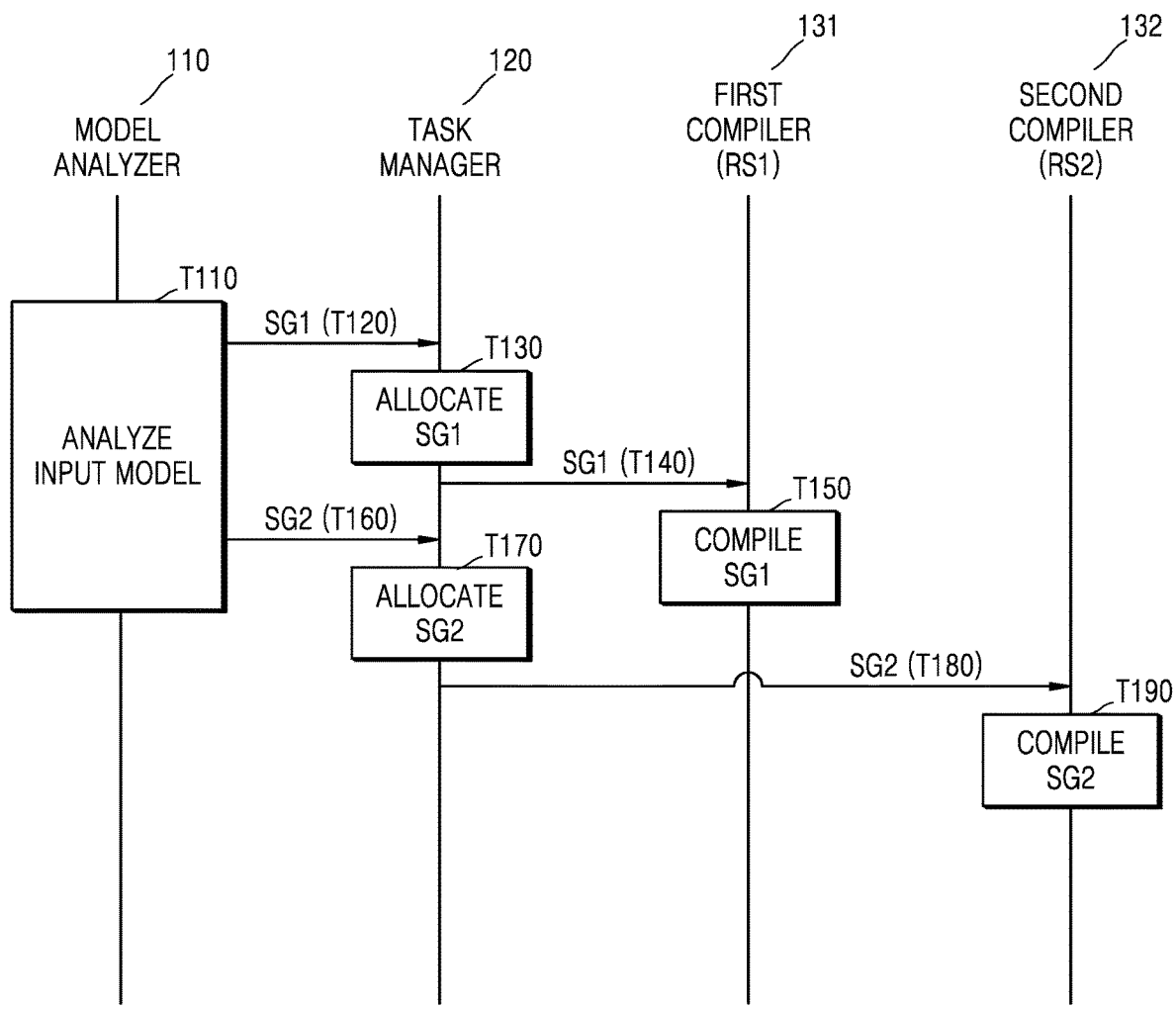
FIG. 6 is a diagram illustrating operations of a model processor, according to an example embodiment.

FIG. 6 is a diagram illustrating operations of a model processor, according to an example embodiment. In particular, FIG. 6 is a diagram illustrating operations of a model processor over time.

Referring to FIG. 6, the model analyzer 110 may analyze an input model (T110) and may output, to the task manager 120, the first subgraph SG1 generated as a result of the analysis (T120). In one embodiment, the model analyzer 110 may generate a calculation processing graph based on the input model and may generate the first subgraph SG1 by partitioning the calculation processing graph based on features of calculations. The first subgraph SG1 may be generated earlier than, i.e., before, the second subgraph SG2.

The task manager 120 may allocate the first subgraph SG1 to a first resource RS1 based on features of calculations included in the first subgraph SG1 and hardware capabilities of a plurality of resources (T130). The task manager 120 may output the first subgraph SG1 to the first compiler 131 corresponding to the first resource RS1 (T140). The first compiler 131 may compile the first subgraph SG1 even before the second subgraph SG2 is generated.

The model analyzer 110 may also output, to the task manager 120, the second subgraph SG1 generated as a result of analyzing the input model (T160). The model analyzer 110 may generate the second subgraph SG2 by partitioning the calculation processing graph based on features of calculations. The task manager 120 may allocate the second subgraph SG2 to a second resource RS2 based on features of calculations included in the second subgraph SG2 and the hardware capabilities of the plurality of resources (T170). The task manager 120 may output the second subgraph SG2 to the second compiler 132 corresponding to the second resource RS2 (T180), and the second compiler 132 may compile the second subgraph SG2 (T190).

According to one embodiment, even before the analysis of the input model is completed, the model analyzer 110 may output the first subgraph SG1 that is generated first to the task manager 120, and the task manager 120 may output the first subgraph SG1 to the first compiler 131 first.

Figure 7:
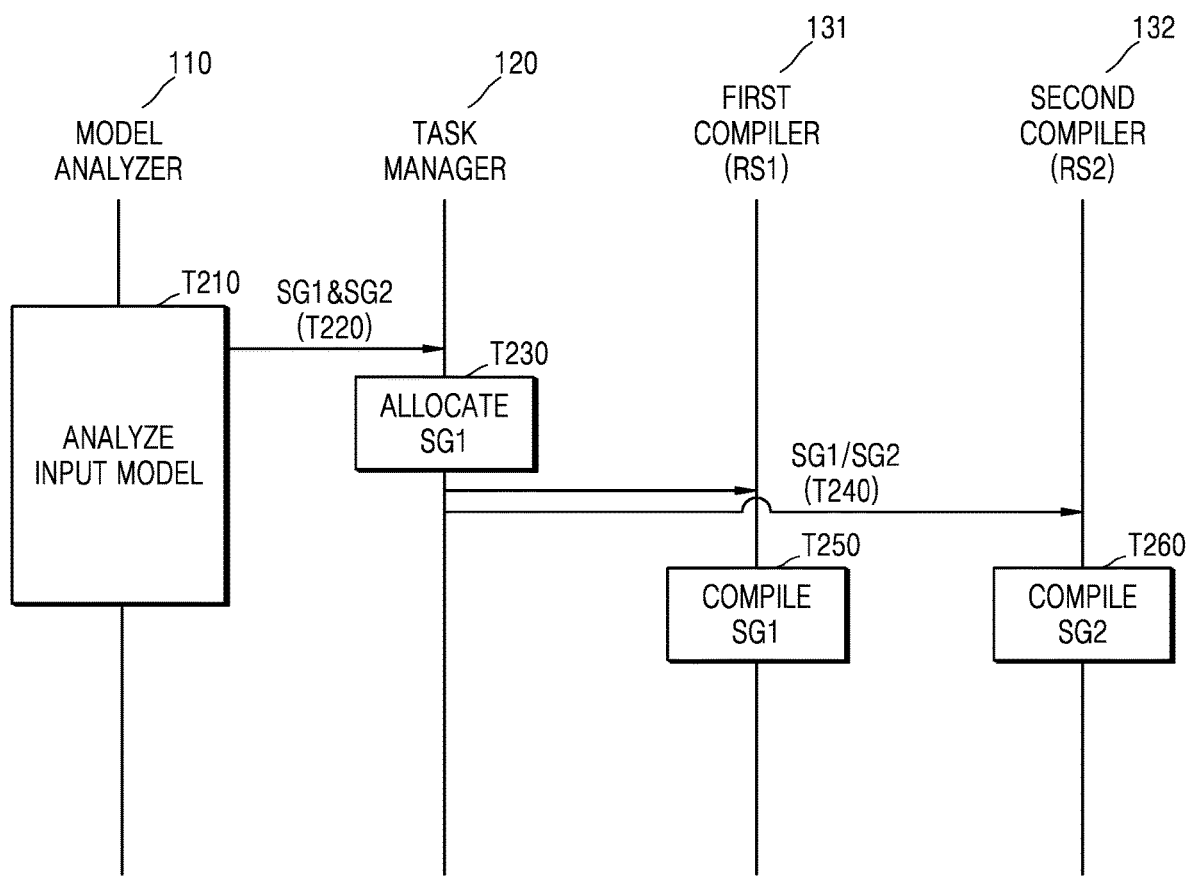
FIG. 7 is a diagram illustrating operations of a model processor, according to an example embodiment.

FIG. 7 is a diagram illustrating operations of a model processor, according to an example embodiment. In particular, FIG. 7 is a diagram illustrating operations of a model processor over time.

Referring to FIG. 7, the model analyzer 110 may analyze an input model (T210) and may output, to the task manager 120, the first subgraph SG1 and the second subgraph SG2, which are generated (T220). The task manager 120 may allocate the first subgraph SG1 to the first resource RS1 and allocate the second subgraph SG2 to the second resource RS2, based on features of calculations included in the first subgraph SG1 and the second subgraph SG2 and the hardware capabilities of the plurality of resources (T230). The first compiler 131 may compile the first subgraph SG1 (T250), and the second compiler 132 may compile the second subgraph SG2 (T260).

According to one embodiment, the plurality of compilers including a first compiler 131 and a second compiler 132 may respectively compile the plurality of subgraphs SG1 and SG2 in parallel, and the compilation of the plurality of subgraphs SG1 and SG2 may be completed quickly.

Figure 8:
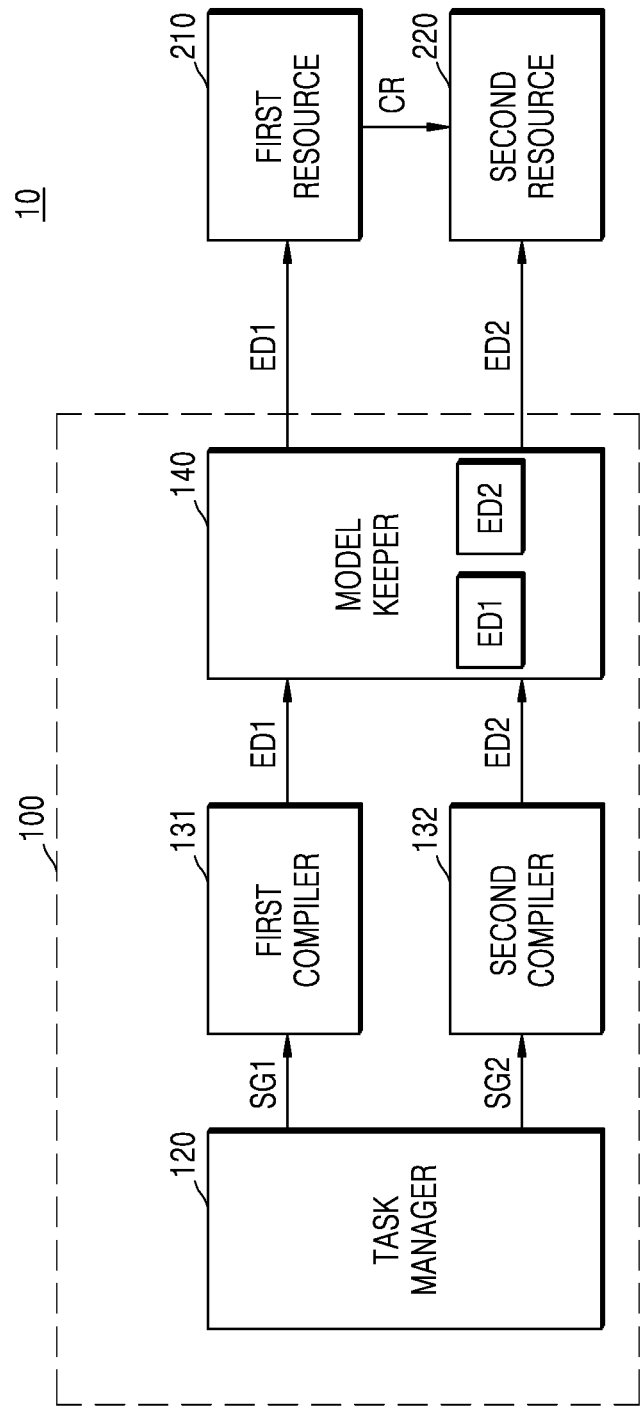
FIG. 8 is a block diagram illustrating a neural network system according to an example embodiment.

FIG. 8 is a block diagram illustrating a neural network system according to an example embodiment. Repeated descriptions given with reference to FIG. 2 will be omitted.

Referring to FIG. 8, the neural network system 10 may include the model processor 100, the first resource 210, and the second resource 220, and the model processor 100 may include the task manager 120, the first compiler 131, the second compiler 132, and a model keeper 140. Since the task manager 120, the first compiler 131, and the second compiler 132 have been described with reference to FIG. 2, descriptions thereof will be omitted.

The first compiler 131 may receive the first subgraph SG1 from the task manager 120 and may generate first execution data ED1 by compiling the first subgraph SG1 to be able to run on the first resource 210. The first compiler 131 may output the first execution data ED1 to the model keeper 140.

The second compiler 132 may receive the second subgraph SG2 from the task manager 120 and may generate second execution data ED2 by compiling the second subgraph SG2 to be able to run on the second resource 220. The second compiler 132 may output the second execution data ED2 to the model keeper 140.

The model keeper 140 may store the first execution data ED1 and the second execution data ED2, output the first execution data ED1 to the first resource 210 in response to or based on a request of the first resource 210, and output the second execution data ED2 to the second resource 220 in response to or based on a request of the second resource 220.

The model keeper 140 may include at least one storage device. As an example, the model keeper 140 may include at least one of volatile memory and nonvolatile memory. The nonvolatile memory may include flash memory, phase-change random access memory (PRAM), magnetic random access memory (MRAM), resistive random access memory (RRAM), ferroelectric random access memory (FRAM), and the like, and the volatile memory may include dynamic random access memory (DRAM), static random access memory (SRAM), synchronous DRAM (SDRAM), a latch, a flip-flop, a register, and the like.

Although the model keeper 140 is shown in FIG. 8 as a component internal to the model processor 100, the model keeper 140 may be implemented as a component separate from the model processor 100, in another example. In one example, the model keeper 140 may be implemented by using at least one of a hard disk drive (HDD), a solid state drive (SSD), Compact Flash (CF), Secure Digital (SD), Micro-SD, Mini-SD, extreme Digital (xD), and Memory Stick. In addition, the model processor 100 may include direct memory access (DMA), memory DMA (MDMA), peripheral DMA (PDMA), remote DMA (RDMA), smart DMA (SDMA), or the like to control access to the model keeper 140.

The first resource 210 may receive the first execution data ED1 and may execute a first calculation corresponding to the first subgraph SG1 based on the first execution data ED1. The second resource 220 may receive the second execution data ED2 independently of the first resource 210 and may load the second execution data ED2. The first resource 210 may generate a calculation result CR by executing the first calculation, and when the second resource 210 receives the calculation result CR, the second resource 210 may execute a second calculation corresponding to the second subgraph SG2 based on the loaded second execution data ED2 and the calculation result CR.

According to one embodiment, each of a plurality of resources 210 and 220 may reduce calculation time by loading execution data in advance before receiving a calculation result according to a previous calculation from the other resource, and thus, a calculation processing capability of the neural network system 10 may be improved.

Figure 9:
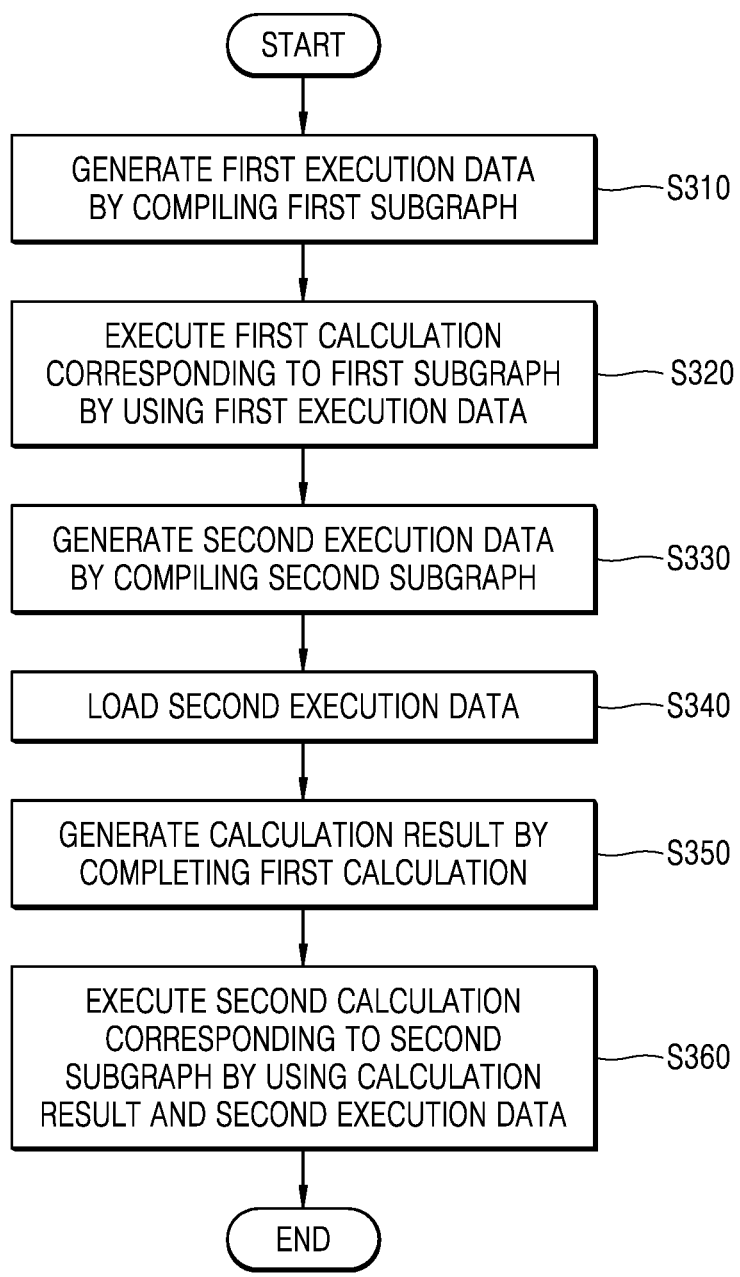
FIG. 9 is a flowchart illustrating operations of a neural network system, according to an example embodiment.

FIG. 9 is a flowchart illustrating operations of a neural network system, according to an example embodiment.

Referring to FIGS. 8 and 9, the neural network system 10 may generate the first execution data ED1 by compiling the first subgraph SG1 (S310). The neural network system 10 may execute the first calculation corresponding to the first subgraph SG1 by using the first execution data ED1 (S320). The neural network system 10 may generate the second execution data ED2 by compiling the second subgraph SG2 (S330). The neural network system 10 may load the second execution data ED2 even before the first calculation for the first execution data ED1 is completed (S340). The neural network system 10 may generate the calculation result CR by completing the first calculation (S350) and may execute the second calculation corresponding to the second subgraph SG2 by using the generated calculation result CR and the second execution data ED2 loaded in advance (S360).

Figure 10:
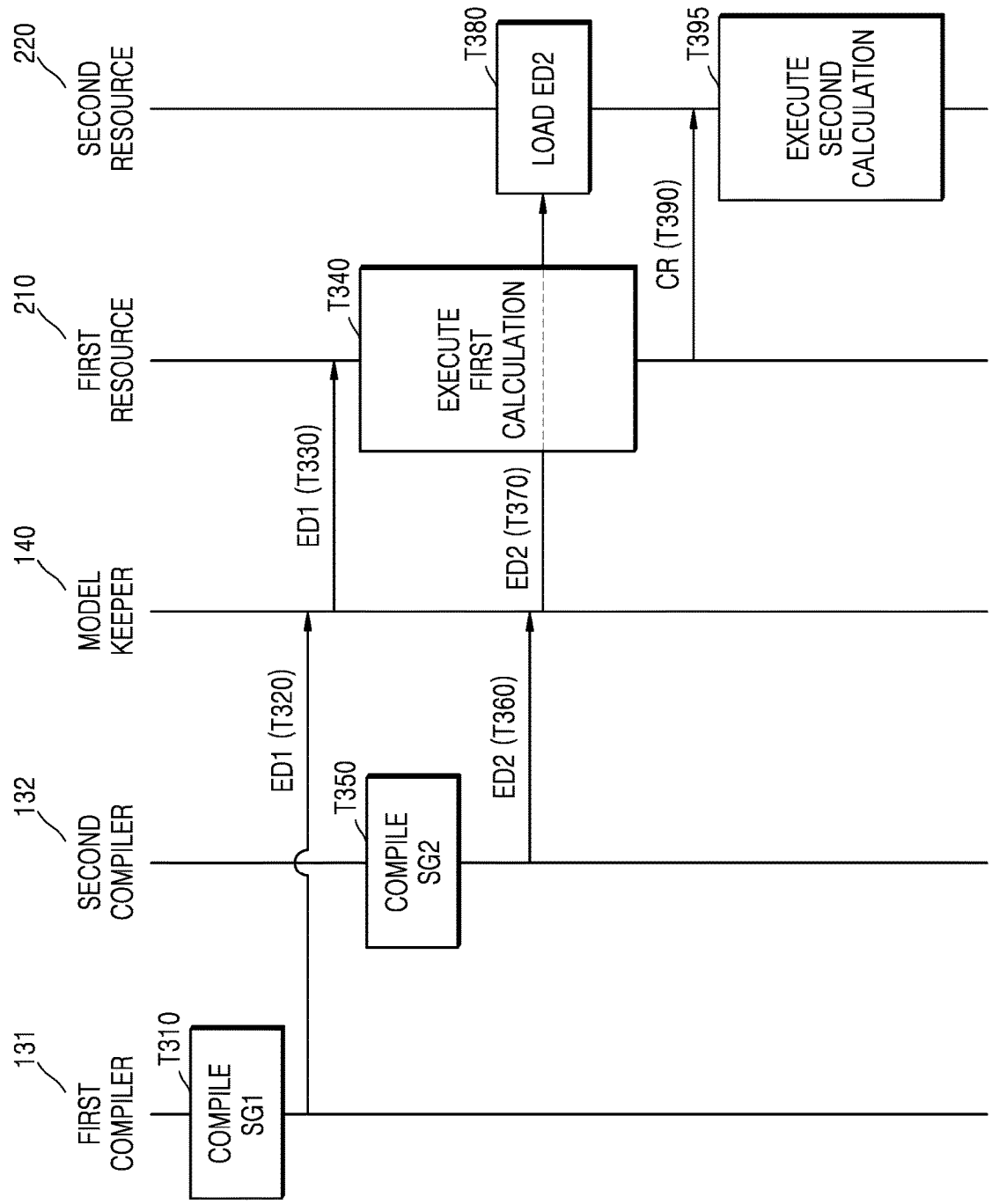
FIG. 10 is a diagram illustrating operations of a neural network system, according to an example embodiment.

FIG. 10 is a diagram illustrating operations of a neural network system, according to an example embodiment. In particular, FIG. 10 is a diagram illustrating operations of a neural network system over time after compiling a plurality of subgraphs.

Referring to FIG. 10, the first compiler 131 corresponding to the first resource 210 may compile the first subgraph SG1 (T310) and may output the first execution data ED1 generated thereby to the model keeper 140 (T320). The model keeper 140 may output the received first execution data ED1 to the first resource 210 (T330), and the first resource 210 may execute a first calculation based on the first execution data ED1 (T340).

The second compiler 132 corresponding to the second resource 220 may compile the second subgraph SG2 (T350) and may output the second execution data ED2 generated thereby to the model keeper 140 (T360). The model keeper 140 may output the received second execution data ED2 to the second resource 220 (T370), and the second resource 220 may load the second execution data ED2 (T380).

The first resource 210 may output the calculation result CR generated by executing the first calculation to the second resource 220 (T390), and the second resource 220 may perform a second calculation by using the calculation result CR and the loaded second execution data ED2 (T395).

Figure 11:
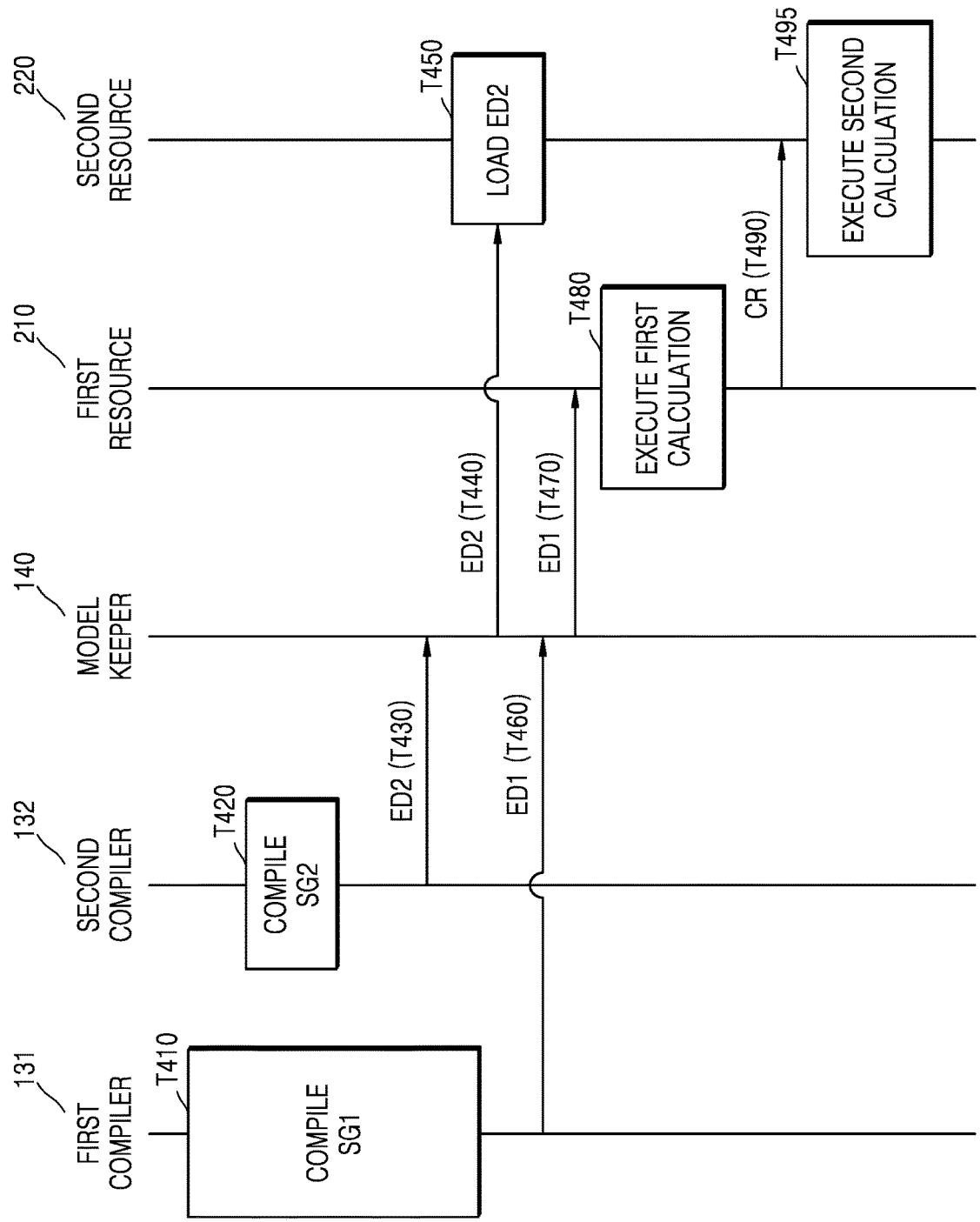
FIG. 11 is a diagram illustrating operations of a neural network system, according to an example embodiment.

FIG. 11 is a diagram illustrating operations of a neural network system, according to an example embodiment. In particular, FIG. 11 is a diagram illustrating operations of a neural network system over time after compiling a plurality of subgraphs.

Referring to FIG. 11, the first compiler 131 corresponding to the first resource 210 may compile the first subgraph SG1

(T410), and the second compiler 132 corresponding to the second resource 220 may compile the second subgraph SG2 (T420). The compiling of the second subgraph SG2 may be completed before the compiling of the first subgraph SG1 is completed, and thus, the second compiler 132 may output the generated second execution data ED2 to the model keeper 140 (T430).

The model keeper 140 may output the second execution data ED2 to the second resource 220 (T440), and the second resource 220 may load the second execution data ED2 even before the compiling of the first subgraph SG1 (T410) is completed (S450).

The first compiler 131 may output, to the model keeper 140, the first execution data ED1 generated by the completion of the compiling of the first subgraph SG1 (T460). The model keeper 140 may output the first execution data ED1 to the first resource 210 (T470), and the first resource 210 may execute a first calculation corresponding to the first subgraph SG1 (T480).

The first resource 210 may output the calculation result CR generated by executing the first calculation to the second resource 220 (T490), and the second resource 220 may execute a second calculation by using the calculation result CR and the loaded second execution data ED2 (T495).

Figure 12:
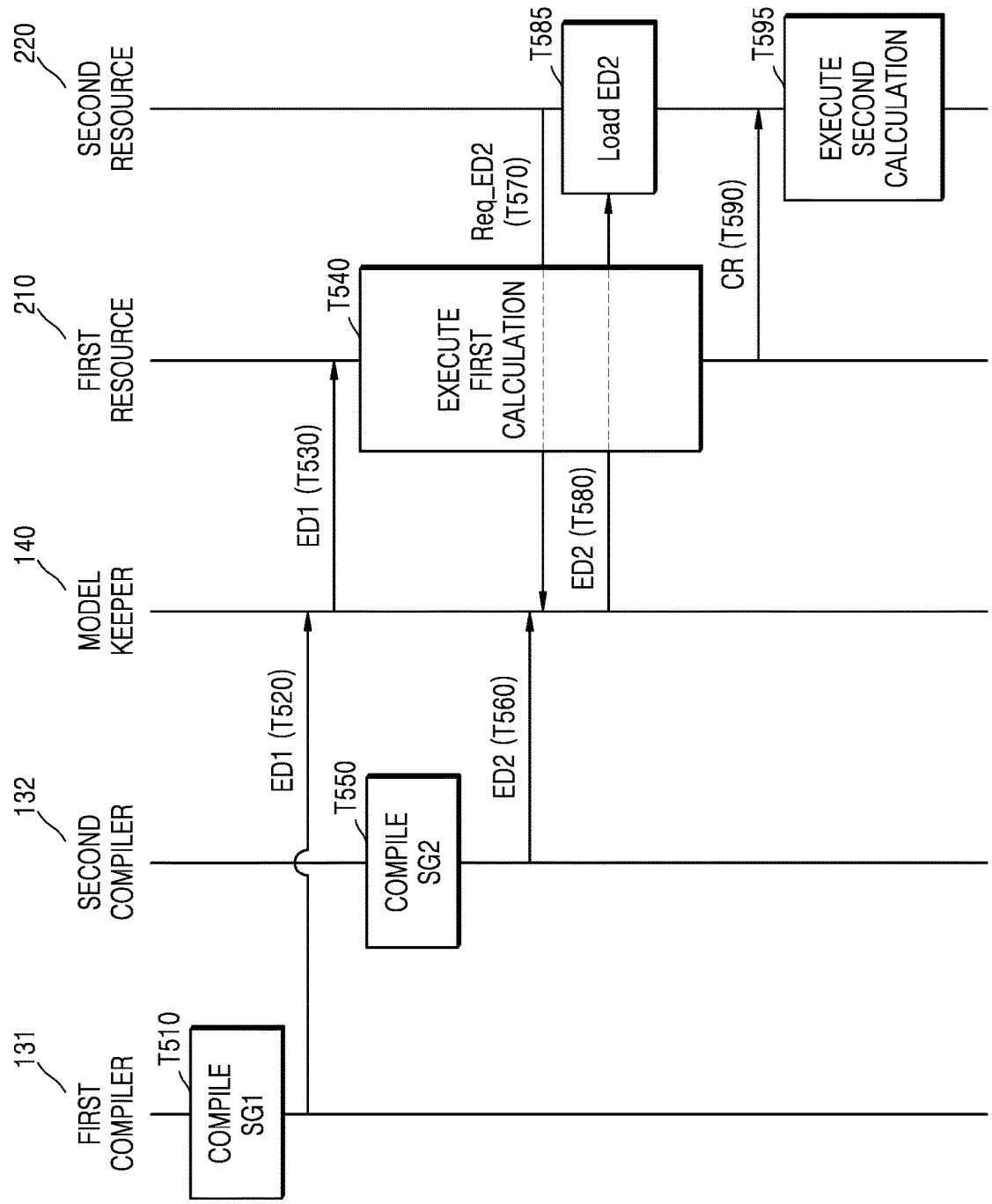
FIG. 12 is a diagram illustrating operations of a neural network system, according to an example embodiment.

FIG. 12 is a diagram illustrating operations of a neural network system, according to an example embodiment. In particular, FIG. 12 is a diagram illustrating operations of a neural network system over time after compiling a plurality of subgraphs.

Referring to FIG. 12, the first compiler 131 corresponding to the first resource 210 may compile the first subgraph SG1 (T510) and may output the first execution data ED1 generated thereby to the model keeper 140 (T520). The model keeper 140 may output the received first execution data ED1 to the first resource 210 (T530), and the first resource 210 may execute a first calculation based on the first execution data ED1 (T540).

The second compiler 132 corresponding to the second resource 220 may compile the second subgraph SG2 (T550) and may output the second execution data ED2 generated thereby to the model keeper 140 (5360). When the second resource 220 is able to load the second execution data ED2, the second resource 220 may output a second execution data request signal Req_ED2 to the model keeper 140 (T570). In one example, the second resource 220 may output the second execution data request signal Req_ED2 to the model keeper 140 after completing all current tasks. In another example, the second resource 220 may output the second execution data request signal Req_ED2 to the model keeper 140 when the second resource 220 is available to perform a task.

Even in the process of executing the first calculation (T540), the model keeper 140 may output the second execution data ED2 to the second resource 220 in response to or based on the second execution data request signal Req_ED2 (T580), and the second resource 220 may load the second execution data ED2 (T585).

The first resource 210 may output the calculation result CR generated by executing the first calculation to the second resource 220 (T590), and the second resource 220 may execute a second calculation by using the calculation result CR and the loaded second execution data ED2 (T595).

Figure 13:
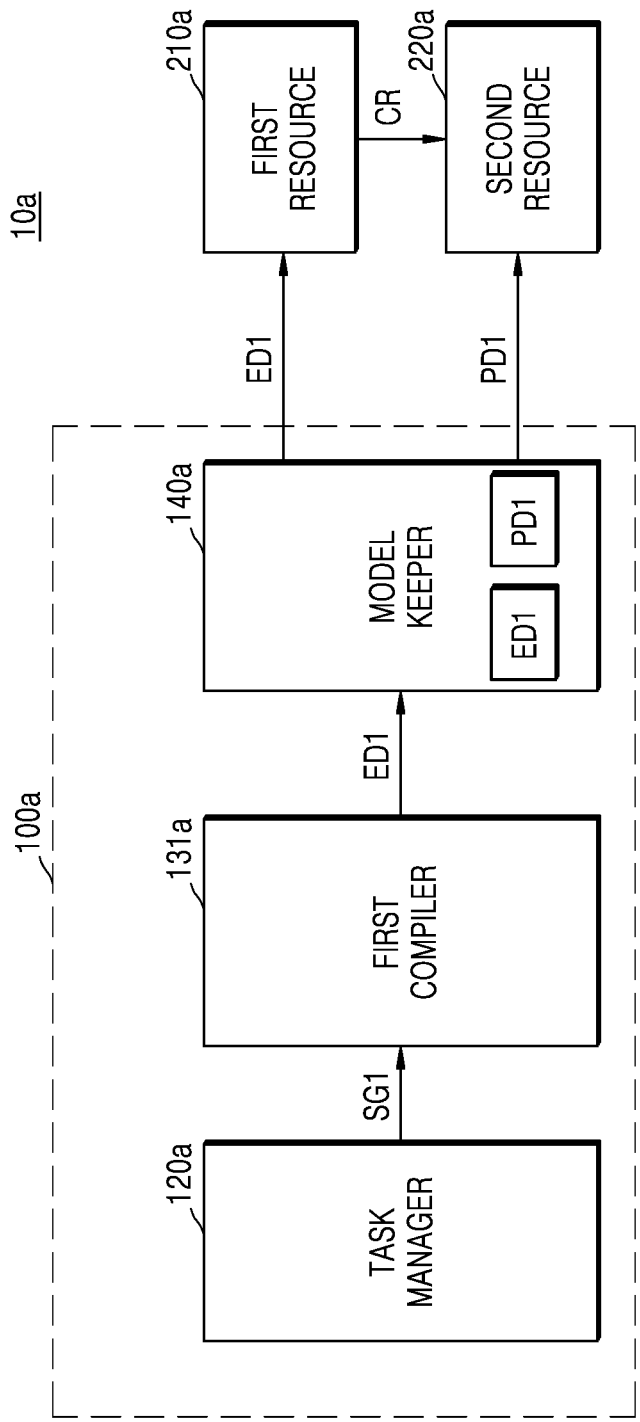
FIG. 13 is a block diagram illustrating a neural network system according to an example embodiment.

FIG. 13 is a block diagram illustrating a neural network system according to an example embodiment. Repeated descriptions given with reference to FIG. 8 will be omitted.

Referring to FIG. 13, a neural network system 10a may include a model processor 100a, a first resource 210a, and a second resource 220a, and the model processor 100a may include a task manager 120a, a first compiler 131a, and a model keeper 140a. Since the task manager 120a and the first compiler 131a may be respectively identical or similar to the task manager 120 and the first compiler 131 in FIG. 8, descriptions thereof will be omitted.

The first compiler 131a may receive the first subgraph SG1 from the task manager 120a and may generate the first execution data ED1 by compiling the first subgraph SG1 to be able to run on the first resource 210a. The first compiler 131a may output the first execution data ED1 to the model keeper 140a.

The model keeper 140a may store the first execution data ED1 and first pre-built data PD1. The first pre-built data PD1 may be pre-built data corresponding to a second subgraph. The term "pre-built data" used herein may refer to data having a previously known compiled result of a specific subgraph. The neural network system 10a may previously store, in the model keeper 140a, data in which a specific subgraph is compiled, and may execute a calculation by using the pre-built data stored in the model keeper 140a, without additional compilation during a calculation process for the specific subgraph.

The model keeper 140a may output the first execution data ED1 to the first resource 210a in response to or based on a request of the first resource 210a and output the first pre-built data PD1 to the second resource 220a in response to or based on a request of the second resource 220a.

The first resource 210a may receive the first execution data ED1 and may execute a first calculation corresponding to the first subgraph SG1 based on the first execution data ED1. The second resource 220a may receive the first pre-built data PD1 independently of the first resource 210a and may load the first pre-built data PD1. The first resource 210a may generate the calculation result CR by executing the first calculation, and when the second resource 220a receives the calculation result CR, the second resource 220a may execute a second calculation corresponding to the second subgraph based on the loaded first pre-built data PD1 and the calculation result CR.

Figure 14:
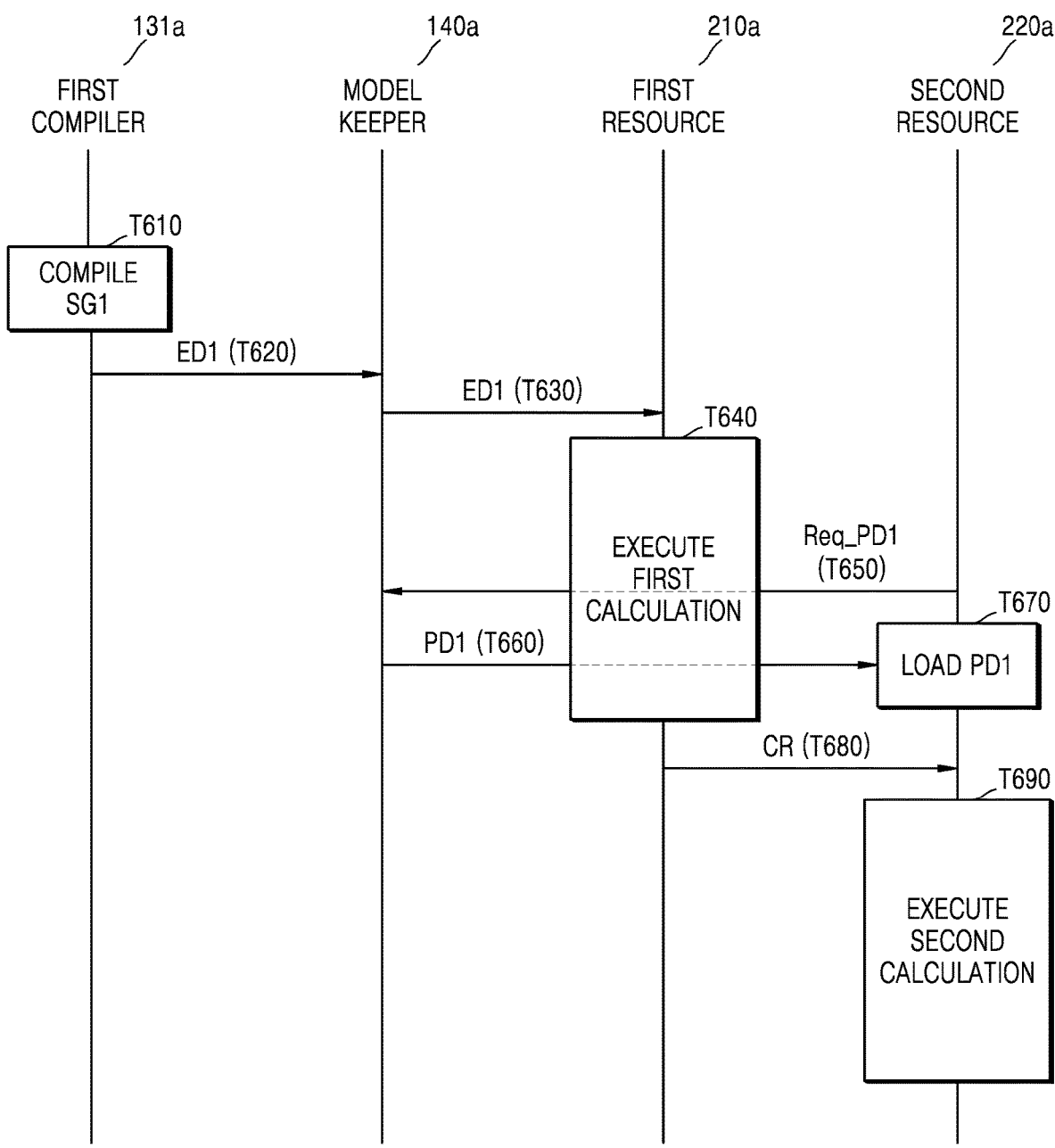
FIG. 14 is a diagram illustrating operations of a neural network system, according to an example embodiment.

FIG. 14 is a diagram illustrating operations of a neural network system, according to an example embodiment. In particular, FIG. 14 is a diagram illustrating operations of a neural network system over time after compiling a plurality of subgraphs.

Referring to FIG. 14, the first compiler 131a corresponding to the first resource 210a may compile the first subgraph SG1 (T610) and may output the first execution data ED1 generated thereby to the model keeper 140a (T620). The model keeper 140a may output the received first execution data ED1 to the first resource 210a (T630), and the first resource 210a may execute a first calculation based on the first execution data ED1 (T640).

When the second resource 220a is able to load the first pre-built data PD1, the second resource 220a may output a first pre-built data request signal Req_PD1 to the model keeper 140a (T650). In one example, the second resource 220a may output the first pre-built data request signal Req_PD1 to the model keeper 140a after completing all current tasks. In another example, the second resource 220a may output the first pre-built data request signal Req_PD1 to the model keeper 140a when the second resource 220a is available to perform a task.

Even in the process of executing the first calculation (T640), the model keeper 140a may output the first pre-built data PD1 to the second resource 220a in response to or based on the first pre-built data request signal Req_PD1 (T660), and the second resource 220a may load the first pre-built data PD1 (T670).

The first resource 210a may output the calculation result CR generated by executing the first calculation to the second resource 220a (T680), and the second resource 220a may execute a second calculation by using the calculation result CR and the loaded first pre-built data PD1 (T690).

Figure 15:
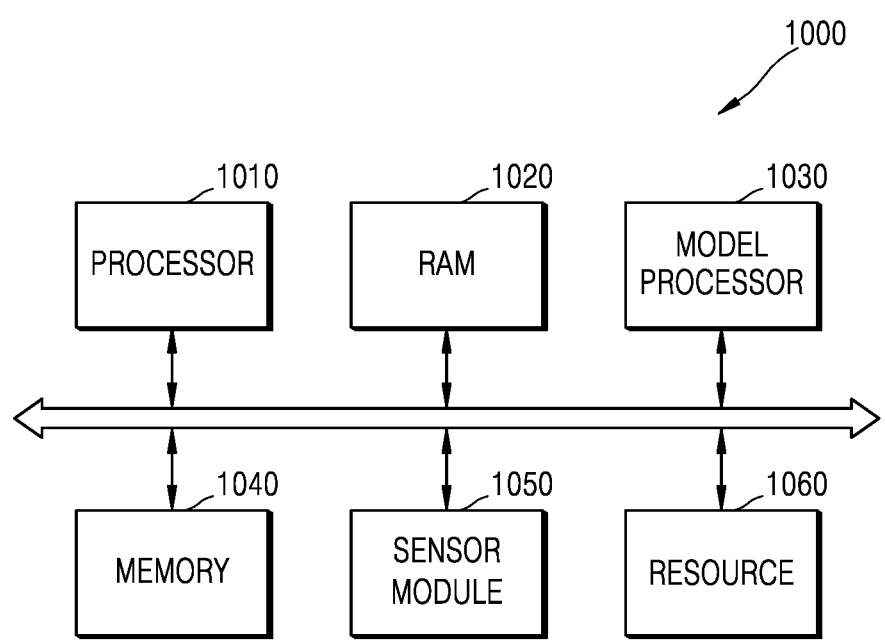
FIG. 15 is a block diagram illustrating an electronic system according to an example embodiment.

FIG. 15 is a block diagram illustrating an electronic system according to an example embodiment.

Referring to FIG. 15, an electronic system 1000 may extract valid information by analyzing input data in real time based on a neural network and may determine a situation based on the extracted information or may control components of an electronic device in which the electronic system 1000 is mounted. For example, the electronic system 1000 may be applied to a robot device such as a drone or an advanced drivers assistance system (ADAS), a smart TV, a smart phone, a medical device, a mobile device, an image display device, a measurement device, an IoT device, or the like, and may be mounted in at least one of various electronic devices in addition thereto.

The electronic system 1000 may include a processor 1010, RAM 1020, a model processor 1030, memory 1040, a sensor module 1050, and a resource 1060. The components of the electronic system 1000 may be connected to each other in a communicable manner via a bus. The processor 1010 may control an overall operation of the electronic system 1000. For example, the processor 1010 may control a function of the model processor 1030 by executing programs stored in the RAM 1020. In addition, the processor 1010 may output an input model, on which deep learning is to be performed based on a neural network, to the model processor 1030 by controlling the RAM 1020, the memory 1040, and the like. The RAM 1020 may temporarily store programs, data, applications, or instructions.

The model processor 1030 may execute a calculation of the neural network by controlling the received resource 1060 and may generate an information signal based on a result of the executing of the calculation. The memory 1040 is a storage location for storing data and, for example, may store various data generated in the process of executing calculations by the model processor 1030 and the resource 1060. The sensor module 1050 may sense or receive a signal (for example, an image signal, an audio signal, a magnetic signal, a bio-signal, a touch signal, or the like) from outside the electronic system 1000 and may convert the signal into data. The resource 1060 may include a calculation resource for executing a large number of calculations based on the neural network, or a communication resource implemented with various wired or wireless interfaces that may communicate with devices external to the electronic system 1000.

According to the inventive concept, the model processor 1030 may perform parallel compilation to output execution data to the resource 1060, whereby a process of calculation processing may be efficiently performed.

The example embodiments described above may be written in programs executable on computers and may be implemented in general-purpose digital computers that run the programs by using computer-readable recording media. In addition, data structures used in the example embodiments described above may be recorded in computer-readable recording media by various means. The computer-readable recording media may include storage media such as magnetic storage media (for example, read-only memory (ROM), floppy disks, hard disks, or the like) or optical reading media (for example, compact disc-ROM (CD-ROM), digital versatile disc (DVD), or the like).

While the inventive concept has been particularly shown and described with reference to embodiments thereof, it will be understood by those skilled in the art that various changes in form and details may be made therein without departing from the spirit and scope of the following claims. In addition, it should be understood that particular terms used herein are only for the purpose of describing the embodiments and are not intended to limit the inventive concept. Therefore, the scope of the inventive concept should be defined by the accompanying claims and equivalents thereof.

What is claimed is:

1. A system for managing a calculation processing graph of an artificial neural network run by a plurality of heterogeneous resources, the system comprising:
   a memory storing instructions; and
   at least one processor configured to execute the instructions to implement:
      a model analyzer configured to generate a plurality of subgraphs comprising a first subgraph and a second subgraph by dividing the calculation processing graph generated based on an input model;
      a task manager configured to allocate the plurality of heterogeneous resources to the first subgraph and the second subgraph;
      a first compiler configured to generate first execution data by to be able to run on a first resource among the plurality of heterogeneous resources by compiling the first subgraph;
      a second compiler configured to generate second execution data to be able to run on a second resource among the plurality of heterogeneous resources by compiling the second subgraph in parallel with compiling the first subgraph;
      a model keeper configured to:
         receive the first execution data and the second execution data;
         output the first execution data to the first resource; and
         output the second execution data to the second resource,
   wherein the first subgraph and the second subgraph respectively output to the first compiler and the second compiler through separate calculation paths,
   wherein the second resource is configured to:
      receive the second execution data;
      receive a result value of a first calculation; and
      execute a second calculation based on the received second execution data and the result value of the first calculation, and
   wherein the first subgraph is allocated to the first resource before the second subgraph is generated.

2. The system according to claim 1, wherein the task manager is further configured to output the first subgraph to the first compiler corresponding to the first resource and output the second subgraph to the second compiler corresponding to the second resource, and
   the first compiler and the second compiler are configured to be operated independently of each other.

3. The system according to claim 1, wherein
   the model analyzer:
      receives the input model, and
      analyzes the input model to generate the calculation processing graph.

4. The system according to claim 3, wherein the model analyzer is further configured to simultaneously or sequentially output the plurality of subgraphs to the task manager based on timings when the generation of each of the plurality of subgraphs is completed, and the task manager is further configured to output the first subgraph to the first compiler corresponding to the first resource that is allocated to the first subgraph.

5. The system according to claim 3, wherein the model analyzer comprises:

a model parser configured to receive the input model and extract model information from the input model;

a model builder configured to generate the calculation processing graph by analyzing the input model based on the model information; and a model optimizer configured to perform an optimization operation on the calculation processing graph.

6. The system according to claim 5, wherein the optimization operation comprises at least one of a graph substitution operation for substituting at least a portion of the calculation processing graph with another graph, a graph merging operation for merging at least portions of the calculation processing graph, and a graph division operation for dividing at least a portion of the calculation processing graph.

7. The system according to claim 1, wherein the model keeper is further configured to output the first execution data to the first resource and output the second execution data to the second resource, simultaneously or sequentially based on timings when the first compiler completes compiling the first subgraph and the second compiler completes compiling the second subgraph.

8. The system according to claim 1, wherein:

the first resource is configured to execute the first calculation corresponding to the first subgraph by using the first execution data;

the second resource is configured to execute the second calculation corresponding to the second subgraph by using the second execution data, and the first resource executes the first calculation before the second compiler completes compilation of the second subgraph.

9. The system according to claim 8, wherein the second resource executes the second calculation corresponding to the second subgraph by using the second execution data and the result value of the first calculation and loads the second execution data from the model keeper before receiving the result value of the first calculation.

10. The system according to claim 9, wherein the second resource is configured to output, to the model keeper, a second execution data request signal requesting the second execution data, when the second resource is able to execute the second calculation, and the model keeper outputs the second execution data to the second resource based on the second execution data request signal.

11. The system according to claim 1, wherein the first compiler is further configured to compile the first subgraph to generate the first execution data that is executable on the first resource, and wherein the second compiler is further configured to compile the second subgraph to generate the second execution data that is executable on the second resource.

12. A method of managing a calculation processing graph of an artificial neural network run by a plurality of heterogeneous resources, the method comprising:

generating a plurality of subgraphs comprising a first subgraph and a second subgraph by diving the calculation processing graph;

allocating the first subgraph to a first resource among the plurality of heterogeneous resources before the second subgraph is generated;

generating first execution data to be able to run on the first resource by compiling the first subgraph;

allocating the second subgraph to a second resource among the plurality of heterogeneous resources;

generating second execution data to be able to run on the second resource by compiling the second subgraph in parallel with the compiling the first subgraph, receiving the first execution data and the second execution data;

outputting the first execution data to the first resource;

outputting the second execution data to the second resource, wherein the first subgraph and the second subgraph are respectively output to a first compiler and a second compiler through separate calculation paths, and wherein the second resource is configured to:
receive the second execution data;
receive a result value of a first calculation; and
execute a second calculation based on the received second execution data and the result value of the first calculation.

13. The method according to claim 12, wherein the compiling of the first subgraph and the compiling of the second subgraph are performed independently of each other.

14. The method according to claim 12, further comprising:

generating the first subgraph by analyzing an input model; and generating the second subgraph by analyzing the input model, wherein the first subgraph is output to the first resource before the generating of the second subgraph is completed.

15. The method according to claim 14, wherein the generating of the first subgraph comprises:

extracting model information from the input model;

generating the calculation processing graph by analyzing the input model based on the model information;

optimizing the calculation processing graph; and generating the first subgraph by partitioning the calculation processing graph.

16. The method according to claim 15, wherein the optimizing of the calculation processing graph comprises at least one of a graph substitution operation for substituting at least a portion of the calculation processing graph with another graph, a graph merging operation for merging at least portions of the calculation processing graph, and a graph division operation for dividing at least a portion of the calculation processing graph.

17. The method according to claim 12, further comprising:

generating first execution data as a result of the compiling of the first subgraph; and generating second execution data as a result of the compiling of the second subgraph.

18. The method according to claim 17, further comprising:

executing the first calculation corresponding to the first subgraph by using the first execution data, wherein the executing of the first calculation is performed before the compiling of the second subgraph is completed.

19. A device of performing deep learning by using a calculation processing graph of an artificial neural network, the device comprising:
   a memory storing instructions; and
   at least one processor configured to execute the instructions to implement:
      a model analyzer configured to generate a plurality of subgraphs comprising a first portion of the calculation processing graph and a second portion of the calculation processing graph by dividing the calculation processing graph;
      a first compiler configured to generate first execution data to be able to run on a first resource by compiling at least the first portion of the calculation processing graph;
      a second compiler configured to generate second execution data to be able to run on a second resource that is different from the first resource by compiling at least the second portion of the calculation processing graph in parallel with compiling the first portion of the calculation processing graph;
      a task manager configured to output the first portion of the calculation processing graph to the first compiler and output the second portion of the calculation processing graph to the second compiler; and
      a model keeper configured to:
         receive the first execution data and the second execution data;
         output the first execution data to the first resource;
         receive, from the second resource, a request for the second execution data; and
         output the second execution data to the second resource while the first resource executes a first calculation,
   wherein the first compiler and the second compiler are operated independently of each other,
   wherein the second resource is configured to:
      receive the second execution data;
      receive a result value of the first calculation; and
      execute a second calculation based on the received second execution data and the result value of the first calculation, and
   wherein the first portion is allocated to the first resource before the second portion is generated.

* * * * *